United States Patent
Hou et al.

(10) Patent No.: US 11,161,412 B2
(45) Date of Patent: Nov. 2, 2021

(54) ELECTRIC SCOOTER PILOTING METHOD, ELECTRIC SCOOTER AND STORAGE MEDIUM

(71) Applicant: Ninebot (Beijing) Tech Co., Ltd., Beijing (CN)

(72) Inventors: Zhu Hou, Beijing (CN); Weining Xi, Beijing (CN); Yubin Yuan, Beijing (CN); Zichong Chen, Beijing (CN); Zhongyuan Chen, Beijing (CN)

(73) Assignee: Ninebot (Beijing) Tech Co., Ltd., Beijing (CN)

( * ) Notice: Subject to any disclaimer, the term of this patent is extended or adjusted under 35 U.S.C. 154(b) by 28 days.

(21) Appl. No.: 16/412,456

(22) Filed: May 15, 2019

(65) Prior Publication Data
US 2020/0180433 A1    Jun. 11, 2020

(30) Foreign Application Priority Data
Dec. 7, 2018    (CN) .......................... 201811497110.8

(51) Int. Cl.
| | | |
|---|---|---|
| B60K 31/00 | (2006.01) | |
| B62K 15/00 | (2006.01) | |
| B62J 45/20 | (2020.01) | |
| B60W 50/04 | (2006.01) | |

(52) U.S. Cl.
CPC ........ B60K 31/0008 (2013.01); B62K 15/006 (2013.01); *B60W 2050/046* (2013.01); *B60W 2420/42* (2013.01); *B60W 2420/52* (2013.01); *B62J 45/20* (2020.02); *B62K 2202/00* (2013.01)

(58) Field of Classification Search
CPC .............. B60K 31/0008; B62K 15/006; B62K 2202/00; B62J 45/20; B60W 2050/046; B60W 2420/42; B60W 2420/52

USPC ......................................................... 340/435
See application file for complete search history.

(56) References Cited

U.S. PATENT DOCUMENTS

| | | | |
|---|---|---|---|
| 5,388,659 A | 2/1995 | Pepe | |
| 6,186,252 B1 | 2/2001 | Schaffner et al. | |
| 9,284,002 B2 * | 3/2016 | Robertson | G09B 19/16 |
| 10,723,189 B2 * | 7/2020 | Tang | B62K 5/01 |
| 10,793,146 B2 * | 10/2020 | Ginther | B60W 10/02 |
| 2007/0193790 A1 * | 8/2007 | Goldenberg | B62D 55/14 |
| | | | 180/9.1 |

(Continued)

FOREIGN PATENT DOCUMENTS

| | | |
|---|---|---|
| CN | 201530430 U | 7/2010 |
| CN | 102632952 B | 9/2013 |

(Continued)

OTHER PUBLICATIONS

Corresponding JP application search results.
Corresponding KR application search report dated Nov. 30, 2020.
Corresponding JP search results dated Apr. 20, 2021.

*Primary Examiner* — Quan-Zhen Wang
*Assistant Examiner* — Mancil Littlejohn, Jr.
(74) *Attorney, Agent, or Firm* — Gang Yu

(57) ABSTRACT

The present disclosure provides a method for piloting an electric scooter, the electric scooter and a storage medium. The method includes: receiving a driving instruction; and in response to the driving instruction, piloting the electric scooter to a target charging device according to a navigation path at least in one of the following manners: lowering a gravity center of the electric scooter; and under a condition in which an obstacle is detected, controlling the electric scooter to avoid the obstacle or wait for a predetermined period of time.

17 Claims, 6 Drawing Sheets a driving instruction is received — S902 in response to the driving instruction, an electric scooter is piloted to a target charging device according to a navigation path at least in one of the following manners: a gravity center of the electric scooter is lowered; and under a condition in which an obstacle is detected, the electric scooter is controlled to avoid the obstacle or wait for predetermined time — S904

(56) References Cited

U.S. PATENT DOCUMENTS

| | | | |
|---|---|---|---|
| 2008/0190682 A1* | 8/2008 | Mahy | B60B 35/1072 180/209 |
| 2012/0109519 A1* | 5/2012 | Uyeki | H01M 10/44 701/439 |
| 2013/0103245 A1 | 4/2013 | Lee et al. | |
| 2016/0023636 A1* | 1/2016 | Keating | B60R 25/33 701/2 |
| 2016/0355189 A1* | 12/2016 | Lin | B60L 3/12 |
| 2018/0101179 A1 | 4/2018 | Louey et al. | |
| 2019/0058982 A1* | 2/2019 | Lee | B62J 6/02 |

FOREIGN PATENT DOCUMENTS

| | | |
|---|---|---|
| CN | 103448503 A | 12/2013 |
| CN | 205113562 U | 3/2016 |
| CN | 105573325 A | 5/2016 |
| CN | 105711658 A | 6/2016 |
| CN | 107662521 A | 2/2018 |
| CN | 207191277 U | 4/2018 |
| CN | 108298011 A | 7/2018 |
| CN | 108693884 A | 10/2018 |
| CN | 108909920 A | 11/2018 |
| DE | 102007038243 A | 6/2008 |
| JP | 2007-149044 A | 6/2007 |
| JP | 2007161198 A | 6/2007 |
| JP | 2007-213180 A | 8/2007 |
| JP | 2014-533620 A | 12/2014 |
| JP | 2016-508091 A | 3/2016 |
| KR | 101212766 A | 12/2012 |
| WO | 2017217936 A | 12/2017 |
| WO | 2018013094 A | 1/2018 |
| WO | WO-2019103695 A1 * | 5/2019 ............. G06Q 30/06 |

\* cited by examiner

ELECTRIC SCOOTER PILOTING METHOD, ELECTRIC SCOOTER AND STORAGE MEDIUM

TECHNICAL FIELD

The present disclosure relates to the field of communication, and in particular to an electric scooter piloting method, the electric scooter and a storage medium.

BACKGROUND

In the related art, there are many ride sharing manners such as a bicycle, a motor vehicle and a scooter. The advantages and disadvantages of these manners are obviously different. The bicycle is maintained conveniently but has a slow speed and is labor-consuming; the motor vehicle has a fast speed and a large transport capacity but the motor vehicle is high in cost and is not environment-friendly; and for the scooter, the speed is moderate and the occupied space is small but the charging and maintenance are difficult; and particularly for manual carriage and plug-wire charging, it is necessary to first locate and find a scooter with low electric quantity; and however, when an electric scooter drives automatically, it is very easy to occur the technical problems of unsafety and turnover.

Concerning the problems of unsafety and easy turnover in a process of piloting the electric scooter in the related art, an effectively technical solution hasn't been proposed yet.

SUMMARY

The embodiments of the present disclosure provide an electric scooter piloting method, electric scooter and the electric scooter, to at least solve the problems of unsafety and easy turnover in a process of piloting the electric scooter in the related art.

According to one embodiment of the present disclosure, there is provided an electric scooter piloting method, which includes the following, steps: a driving instruction is received; and in response to the driving instruction, the electric scooter is piloted to a target charging device according to a navigation path at least in one of the following manners: a gravity center of the electric scooter is lowered; and under a condition in which an obstacle is detected, the electric scooter is controlled to avoid the obstacle or wait for a predetermined period of time.

In this embodiment of the present disclosure, before the step that the electric scooter is piloted to a target charging device according to a navigation path at least in one of the following manners: a gravity center of the electric scooter is lowered; and under a condition in which an obstacle is detected, the electric scooter is controlled to avoid the obstacle or wait for predetermined time, the method further includes the following step:

Whether the obstacle is present or not within a predetermined range from the electric scooter is detected via a detection component on the electric scooter.

In this embodiment of the present disclosure, the step that a gravity center of the electric scooter is lowered includes at least one of the followings: a support rod of the electric scooter is controlled to automatically fold to lower the gravity center of the electric scooter; and the support rod of the electric scooter is controlled to automatically reduce a height of the support rod to lower the gravity center of the electric scooter.

In this embodiment of the present disclosure, the detection component at least includes one of the followings: a camera, a radar assembly and a sensor.

In this embodiment of the present disclosure, before the step that the electric scooter is piloted to a target charging device according to a navigation path at least in one of the following manners: a gravity center of the electric scooter is lowered; and under a condition in which an obstacle is detected, the electric scooter is controlled to avoid the obstacle or wait for a predetermined period of time, the method further includes the following step: training wheels are provided on the electric scooter to prevent the turnover of the electric scooter.

In this embodiment of the present disclosure, the navigation path includes: a path from a current geographical position of the electric scooter to a target geographical position of the target charging device, wherein the current geographical position is acquired by a GPS module of the electric scooter.

According to another embodiment of the present disclosure, there is further provided an electric scooter, which includes: a receiving module, configured to receive a driving instruction; and a processing module, configured to pilot, in response to the driving instruction, the electric scooter to a target charging device according to a navigation path at least in one of the following manners: a gravity center of the electric scooter is lowered; and under a condition in which an obstacle is detected, the electric scooter is controlled to avoid the obstacle or wait for a predetermined period of time.

In this embodiment of the present disclosure, the electric scooter further includes: a detection component; and the detection component is configured to detect whether the obstacle is present or not within a predetermined range from the electric scooter.

In this embodiment of the present disclosure, the electric scooter further includes: training wheels, provided on the electric scooter.

In this embodiment of the present disclosure, the electric scooter further includes a Global Position System (abbreviated as GPS) module, configured to acquire the current geographical position of the electric scooter.

According to another embodiment of the present disclosure, there is further provided a storage medium; the storage medium stores a computer program; and the computer program is configured to execute the steps of the above-mentioned any electric scooter piloting method in running.

With the disclosure, in the process of piloting the electric scooter the gravity center of the electric scooter is lowered; and/or under the condition in which the obstacle is detected, the electric scooter is controlled to avoid the obstacle or wait for the predetermined period of time; and by adopting the above technical solutions, the technical problems of unsafety and easy turnover in the process of piloting the electric scooter are solved, and thus the safety of the electric scooter in piloting is improved.

BRIEF DESCRIPTION OF THE DRAWINGS

The accompanying drawings are described here to provide a further understanding of the present disclosure. The schematic embodiments and description of the present disclosure are adopted to explain the present disclosure, and do not form improper limits to the present disclosure. In the drawings.

DETAILED DESCRIPTION OF THE EMBODIMENTS

The present disclosure is described below with reference to the drawings and embodiments in detail. It should be noted that the embodiments of the present application and the characteristics of the embodiments may be combined with each other if there is no conflict.

It is to be noted that, terminologies such as "the first" and "the second" in the specification, claims and accompanying drawings of the present disclosure are only used to distinguish similar objects, rather than to describe a special order or a precedence order.

It may be understood that the technical solutions in the following embodiments of the present disclosure are implemented by applying to a system including an electric scooter and a target charging device. In the related art, if the electric scooter needs to be charged, it must be charged manually. In the embodiments of the present disclosure, under a condition in which it is determined that the electric scooter needs to be charged, the embodiments of the present disclosure provide a series of procedures of subsequently piloting the electric scooter to a destination and charging at the destination, which will be described below in combination with embodiments 1-10.

Embodiment 1

Figure 1:
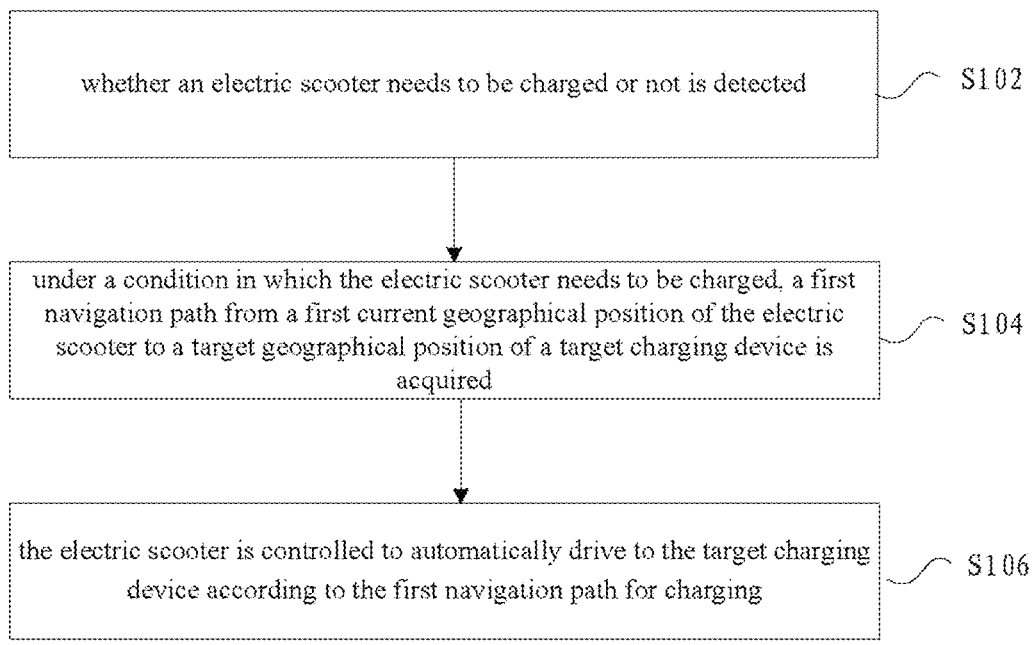
FIG. 1 illustrates a flowchart of an electric scooter charging method according to an embodiment of the present disclosure.

This embodiment of the present disclosure provides an electric scooter charging method. FIG. 1 illustrates a flowchart of an electric scooter charging method according to an embodiment of the present disclosure. As illustrated in FIG. 1, the method includes the following steps.

At Step S102: whether an electric scooter needs to be charged or not is detected.

At Step S104: under a condition in which the electric scooter needs to be charged, a first navigation path from a first current geographical position of the electric scooter to a target geographical position of a target charging device is acquired.

At Step S106, the electric scooter is piloted to the target charging device according to the first navigation path for charging.

With the above steps, under the condition in which it is detected that the electric scooter needs to be charged, the first navigation path from the first current geographical position of the electric scooter to the target geographical position of the target charging device is acquired; and the electric scooter is piloted to the target charging device according to the first navigation path for charging. Therefore, the problems of high maintenance cost, complex process and the like due to the fact that the scooter needs to be maintained manually for charging in the related art are solved, i.e., when the electric scooter needs to be charged, manual participation turns out to be unnecessary, the electric scooter can be piloted to the target charging device according to the first navigation path for charging, and thus the charging efficiency of the scooter is greatly improved.

In the step S104, the first navigation path may be acquired via one of the following manners.

1) The electric scooter requests to a server to acquire the target geographical position of the target charging device; then, the target geographical position, sent by the server, of the target charging device is received, herein the target charging device is a charging device selected by the server from a plurality of charging devices; and the first navigation path is generated according to the first current geographical position and the target geographical position on the electric scooter, herein the first current geographical position is acquired by a GPS module on the electric scooter; and the target charging device is a charging device nearest to the electric scooter and selected by the server from the plurality of charging devices; or the target charging device is a charging device nearest to the electric scooter and selected by the server from reachable charging devices of the electric scooter according to the current electric quantity of the electric scooter; or the target charging device is a charging device randomly selected from reachable charging devices of the electric scooter according to the current electric quantity of the electric scooter.

2) The electric scooter requests to a server to acquire the first navigation path; the first navigation path sent by the server is received, herein the target charging device is a charging device selected by the server from a plurality of charging devices, and the first navigation path is generated by the server according to the first current geographical position and the target geographical position on the electric scooter, wherein the first current geographical position is acquired by a GPS module on the electric scooter, the first current geographical position is reported to the server periodically by the electric scooter, or the first current geographical position is carried in a request message for requesting the server to acquire the first navigation path and the request message carrying the first current geographical position is sent to the server, and the former processing manner is preferable in this embodiment of the present disclosure.

In this embodiment of the present disclosure, after the step that the electric scooter is piloted to the target charging device according to the first navigation path for charging, the method for charging the electric scooter further includes the following step: under a condition in which the electric quantity of the electric scooter is greater than a first threshold, the electric scooter is piloted according to a driving instruction of a server to a target placement position. In general, the electric quantity of the electric scooter is greater than the first threshold refers to a state at which the electric scooter is fully charged. Specifically, the step that the electric scooter is piloted according to a driving instruction of a server to a target placement position includes one of the followings: a first driving instruction is acquired from the server, wherein the first driving instruction at least is used for indicating a first target placement position; a second navigation path is generated according to a second current geographical position of the electric scooter and the first target placement position of the electric scooter on the electric scooter, wherein the second current geographical position is acquired by the GPS module on the electric scooter; in response to the first driving instruction, the electric scooter is piloted to the first target placement position according to the second navigation path; or a second driving instruction is acquired from the server, wherein the second driving instruction at least is used for indicating a third navigation path, the third navigation path is a navigation path from a third current geographical position of the electric scooter to a second target placement position, the third current geographical position is acquired by the GPS module on the electric scooter, and the third current geographical position is reported to the server by the electric scooter; and in response to the second driving instruction, the electric scooter is piloted to the second target placement position according to the third navigation path.

The target placement position may be a placement position in a first target area, wherein the number of electric scooters placed currently in the first target area is lower than a second threshold; the target placement position may also be a placement position having a distance to the electric scooter lower than a third threshold, i.e., the target placement position may be a placement position at which the number of rest electric scooters is small; and the target placement position may further be a placement position having a minimal distance to the electric scooter.

In actual application, a plurality of implementation manners are provided to judge the step S102. Optionally, the following several implementation manners are included.

1) Under a condition in which the electric quantity of the electric scooter is lower than a fourth threshold, it is detected that the electric scooter needs to be charged.

2) Under a condition in which the electric scooter is reserved by a target account number and the electric quantity of the electric scooter is lower than the electric quantity required by the electric scooter to drive to a target position reserved by the target account number, it is detected that the electric scooter needs to be charged.

3) Under a condition in which the electric scooter is reserved by a target account number, the electric quantity of the electric scooter is greater than the electric quantity required by the electric scooter to drive to a target position reserved by the target account number, and after the electric scooter drives to the target position reserved by the target account number, the remaining electric quantity is anticipated to be lower than the electric quantity required by the electric scooter to drive from the target position to a target charging device nearest to the target position, it is detected that the electric scooter needs to be charged.

4) Under a condition in which it is detected that the electric quantity of the electric scooter is lower than a fifth threshold in a process when the electric scooter is ridden, it is detected that the electric scooter needs to be charged.

This embodiment of the present disclosure further provides a technical solution in which an electric scooter may charge to each other, i.e., under the condition in which the electric quantity of the electric scooter is lower than the fourth threshold, the step that the electric scooter is piloted to the target charging device according to the first navigation path for charging includes the following steps.

The electric scooter is piloted to a first target electric scooter according to the first navigation path, wherein the target charging device is the first target electric scooter and the first target electric scooter is configured to allow to charge the electric scooter; and the path reaching to the first target electric scooter may be determined via the following manners: positions of a group of electric scooters are lower than a sixth threshold are acquired; and the first target electric scooter is determined from the group of electric scooters according to the positions of the group of electric scooters, wherein the electric quantity of the electric scooter is greater than the electric quantity required by the electric scooter to drive to the position of the first target electric scooter.

In this embodiment of the present disclosure, under the condition in which the electric scooter is reserved by the target account number and the electric quantity of the electric scooter is lower than the electric quantity required by the electric scooter to drive to the target position reserved by the target account number, or, under the condition in which the electric scooter is reserved by the target account number, the electric quantity of the electric scooter is greater than the electric quantity required by the electric scooter to drive to the target position reserved by the target account number, and after the electric scooter drives to the target position reserved by the target account number, the remaining electric quantity is anticipated to be lower than the electric quantity required by the electric scooter to drive from the target position to the target charging device nearest to the target position, the step that the electric scooter is piloted to the target charging device according to the first navigation path for charging includes the following steps: under a condition in which the time required by the electric scooter is earlier than the use time reserved by the target account number, the electric scooter is piloted to the target charging device according to the first navigation path for charging, wherein the time required by the electric scooter is a sum of the following time: the time required by the electric scooter to drive to the target charging device, the time required by the electric scooter for charging, and the time required by the electric scooter to return from the target charging device to the first current geographical position.

In this embodiment of the present disclosure, under the condition in which the electric scooter is reserved by the target account number and the electric quantity of the electric scooter is lower than the electric quantity required by the electric scooter to drive to the target position reserved by the target account number, the method further includes the following steps: first prompt information is sent to the target account number, wherein the first prompt information is used for indicating that the electric quantity of the electric scooter is insufficient, and replacing the electric scooter reserved by the target account number as a second electric scooter, and the electric quantity of the second target electric scooter is greater than the electric quantity required by the electric scooter to drive to the target position reserved by the target account number.

In this embodiment of the present disclosure, under the condition in which the electric scooter is reserved by the target account number, the electric quantity of the electric scooter is greater than the electric quantity required by the electric scooter to drive to the target position reserved by the target account number, and after the electric scooter drives to the target position reserved by the target account number, the remaining electric quantity is anticipated to be lower than the electric quantity required by the electric scooter to drive from the target position to the target charging device nearest to the target position, the method further includes the following step.

Second prompt information is sent to the target account number, wherein the second prompt information is used for indicating that the electric quantity of the electric scooter is insufficient, and replacing the electric scooter reserved by the target account number as a third electric scooter, the electric quantity of the third target electric scooter is greater than the electric quantity required by the electric scooter to drive to the target position reserved by the target account number, and after the third electric scooter drives to the target position reserved by the target account number, the remaining electric quantity is anticipated to be greater than the electric quantity required by the third electric scooter to drive from the target position to the target charging device nearest to the target position.

In this embodiment of the present disclosure, under the condition in which the electric scooter is reserved by the target account number and the electric quantity of the electric scooter is lower than the electric quantity required by the electric scooter to drive to the target position reserved by the target account number, or, under the condition in which the electric scooter is reserved by the target account number, the electric quantity of the electric scooter is greater than the electric quantity required by the electric scooter to drive to the target position reserved by the target account number, and after the electric scooter drives to the target position reserved by the target account number, the remaining electric quantity is anticipated to be lower than the electric quantity required by the electric scooter to drive from the target position to the target charging device nearest to the target position, after the step that the electric scooter is piloted to the target charging device according to the first navigation path for charging, the method further includes the following step: the electric scooter is piloted to return to the first current geographical position.

In combination with an example, the description will be made for what condition may be defined as the condition needing to be charged but is not intended to limit the technical solutions in the embodiments of the present disclosure.

When a user rides, it is detected by an electric scooter that the current electric quantity has already reached to a charging threshold and an available target charging device is present within an endurance range. In such a situation, the user may be reminded of going to charge, and in the charging process, another scooter with full electric quantity is replaced for the user to use continuously.

When the user makes a reservation for use via an APP of a mobile phone, the electric scooter automatically calculates whether the current electric quantity supports to reach the destination or not as well as the remaining electric quantity after the user reaches the destination and a distance of an available charging station (equivalent to the target charging device in the foregoing embodiment); if any one of conditions is not met, the vehicle automatically is piloted to a current available charging station to supplement a part of electric quantity, and returns to a current position for waiting upon completion; or the current electric scooter sends a request to a background to express that the endurance cannot support to reach the destination, and a background server finds a scooter meeting the endurance requirement from a nearby position to drive to the current position as a replacement.

When no available charging station is present within a vehicle endurance reachable area, a worker is prompted for rescue; and the worker carries the scooter with the low electric quantity on the road by using a charging van, charges the scooter with a vehicle-mounted power supply and places it at a placement point on the road upon the completion of charging.

The electric scooter has a mutual charging function. If the electric quantity of the current scooter is low and the charging station is not within a reachable range, after rescue information is sent, the background server notifies the scooter of other scooters with sufficient electric quantity nearby and sends the position information of them, and the current scooter judges whether the other scooters are within the reachable range or not by planning a navigation path, and drives, if the other scooters are reachable, to charge mutually.

It is to be noted that the electric scooter in this embodiment of the present disclosure needs to have an piloting ability, and the charging manner of the electric scooter without the piloting ability is the same as the conventional art and the electric scooter needs to be manually transported to a position herein a charging device is located for charging.

In other words, in the technical solutions provided by this embodiment of the present disclosure, when the electric scooter with the piloting function has the low electric quantity (i.e., the electric scooter needs to be charged), the electric scooter finds an available charging device to which the endurance may reach nearby via a positioning function, acquires a navigation path via an internal map or from a server side, and enters an piloting mode; meanwhile, training wheels may be selected to prevent the turnover of the scooter in movement; and during the piloting process, the scooter detects a surrounding environment, road and obstacle via a camera or radar component according to the navigation path, and actively avoids the obstacle and/or waits for a predetermined period of time, and the scooter automatically moves to the position of the charging device by using the piloting function for charging.

Through the above description of the embodiment, those skilled in the art may clearly understand that the method according to the above embodiment may be implemented through software in connection with a necessary general hardware platform, or may be implemented by hardware. However, in many cases, the former is a better implementation. Based on this understanding, the technical solution of the embodiment of the present disclosure in essence or the part contributing to the prior art may be embodied in the form of a software product. The computer software product is stored in a storage medium (such as a ROM/RAM, a magnetic disc, an optical disc), including several instructions which may cause a terminal device (such as a mobile phone, a computer, a server, or a network device and the like) to execute the method according to the embodiments of the present disclosure.

Embodiment 2

Figure 2:
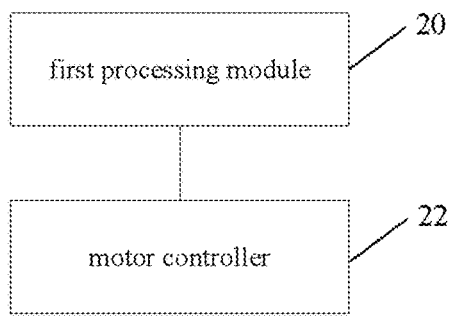
FIG. 2 illustrates a first structural block diagram of an electric scooter according to an embodiment of the present disclosure.

According to another embodiment of the present disclosure, there is further provided an electric scooter. FIG. 2 illustrates a first structural block diagram of an electric scooter according to an embodiment of the present disclosure. As illustrated in FIG. 2, the electric scooter may include a first processing module 20, and a motor controller 22.

The first processing module 20 is configured detect whether an electric scooter needs to be charged or not, and acquire, under a condition in which the electric scooter needs to be charged, a first navigation path which is from a first current geographical position of the electric scooter to a target geographical position of a target charging device.

The motor controller 22 is configured to pilot the electric scooter to the target charging device according to the first navigation path for charging.

With the present disclosure, the first processing module 20 acquires, under the condition in which it is detected that the electric scooter needs to be charged, the first navigation path which is from the first current geographical position of the electric scooter to the target geographical position of the target charging device; and the motor controller 22 pilots the electric scooter to the target charging device according to the first navigation path for charging. Therefore, the problems of high maintenance cost, complex process and the like due to the fact that the scooter needs to be maintained manually for charging in the related art are solved, i.e., when the electric scooter needs to be charged, manual participation turns out to be unnecessary, the electric scooter can drive to the target charging device according to the first navigation path for charging, and thus the charging efficiency of the scooter is greatly improved.

In this embodiment of the present disclosure, the first current geographical position is acquired by a GPS module on the electric scooter.

In this embodiment of the present disclosure, the first navigation path may be acquired via one of the following manners.

1) The electric scooter requests to a server to acquire the target geographical position of the target charging device; then, the target geographical position, sent by the server, of the target charging device is received, herein the target charging device is a charging device selected by the server from a plurality of charging devices; and the first navigation path is generated according to the first current geographical position and the target geographical position on the electric scooter, herein the first current geographical position is acquired by a GPS module on the electric scooter; and the target charging device is a charging device nearest to the electric scooter and selected by the server from the plurality of charging devices, or the target charging device is a charging device nearest to the electric scooter and selected by the server from reachable charging devices of the electric scooter according to the current electric quantity of the electric scooter; or the target charging device is a charging device randomly selected from reachable charging devices of the electric scooter according to the current electric quantity of the electric scooter.

2) The electric scooter requests to a server to acquire the first navigation path; the first navigation path sent by the server is received, herein the target charging device is a charging device selected by the server from a plurality of charging devices; and the first navigation path is generated by the server according to the first current geographical position and the target geographical position on the electric scooter, wherein the first current geographical position is acquired by a GPS module on the electric scooter, and the first current geographical position is reported to the server periodically by the electric scooter.

In this embodiment of the present disclosure, after the step that the electric scooter is piloted to the target charging device according to the first navigation path for charging, the method further includes the following step: under a condition in which the electric quantity of the electric scooter is greater than a first threshold, the electric scooter is piloted according to a driving instruction of a server to a target placement position. In general, the electric quantity of the electric scooter is greater than the first threshold refers to a state at which the electric scooter is fully charged. Specifically, the step that the electric scooter is piloted according to a driving instruction of a server to a target placement position includes one of the followings: a first driving instruction is acquired from the server, herein the first driving instruction at least is used for indicating a first target placement position; a second navigation path is generated according to a second current geographical position of the electric scooter and the first target placement position of the electric scooter on the electric scooter, wherein the second current geographical position is acquired by the GPS module on the electric scooter; in response to the first driving instruction, the electric scooter is piloted to the first target placement position according to the second navigation path; or a second driving instruction is acquired from the server, wherein the second driving instruction at least is used for indicating a third navigation path, the third navigation path is a navigation path from a third current geographical position of the electric scooter to a second target placement position, the third current geographical position is acquired by the GPS module on the electric scooter, and the third current geographical position is reported to the server by the electric scooter; and in response to the second driving instruction, the electric scooter is piloted to the second target placement position according to the third navigation path.

The target placement position may be a placement position in a first target area, wherein the number of electric scooters placed currently in the first target area is lower than a second threshold; the target placement position may also be a placement position having a distance to the electric scooter lower than a third threshold, i.e., the target placement position may be a placement position at which the number of rest electric scooters is small, and the target placement position may further be a placement position having a minimal distance to the electric scooter.

In actual application, 1) under a condition in which the electric quantity of the electric scooter is lower than a fourth threshold, it is detected that the electric scooter needs to be charged.

2) Under a condition in which the electric scooter is reserved by a target account number and the electric quantity of the electric scooter is lower than the electric quantity required by the electric scooter to drive to a target position reserved by the target account number, it is detected that the electric scooter needs to be charged.

3) Under a condition in which the electric scooter is reserved by a target account number, the electric quantity of the electric scooter is greater than the electric quantity required by the electric scooter to drive to a target position reserved by the target account number, and after the electric scooter drives to the target position reserved by the target account number, the remaining electric quantity is anticipated to be lower than the electric quantity required by the electric scooter to drive from the target position to a target charging device nearest to the target position, it is detected that the electric scooter needs to be charged.

4) Under a condition in which it is detected that the electric quantity of the electric scooter is lower than a fifth threshold in a process when the electric scooter is ridden, it is detected that the electric scooter needs to be charged.

This embodiment of the present disclosure further provides a technical solution in which an electric scooter may charge to each other, i.e., under the condition in which the electric quantity of the electric scooter is lower than the fourth threshold, the step that the electric scooter is piloted to the target charging device according to the first navigation path for charging includes the following steps.

The electric scooter is piloted to a first target electric scooter according to the first navigation path, wherein the target charging device is the first target electric scooter and the first target electric scooter is configured to allow to charge the electric scooter, and the path reaching to the first target electric scooter may be determined via the following manners: positions of a group of electric scooters are lower than a sixth threshold are acquired; and the first target electric scooter is determined from the group of electric scooters according to the positions of the group of electric scooters, wherein the electric quantity of the electric scooter is greater than the electric quantity required by the electric scooter to drive to the position of the first target electric scooter.

In this embodiment of the present disclosure, under the condition in which the electric scooter is reserved by the target account number and the electric quantity of the electric scooter is lower than the electric quantity required by the electric scooter to drive to the target position reserved by the target account number, or, under the condition in which the electric scooter is reserved by the target account number, the electric quantity of the electric scooter is greater than the electric quantity required by the electric scooter to drive to the target position reserved by the target account number, and after the electric scooter drives to the target position reserved by the target account number, the remaining electric quantity is anticipated to be lower than the electric quantity required by the electric scooter to drive from the target position to the target charging device nearest to the target position, the step that the electric scooter is piloted to the target charging device according to the first navigation path for charging includes the following steps: under the condition in which the time required by the electric scooter is earlier than the use time reserved by the target account number, the electric scooter is piloted to the target charging device according to the first navigation path for charging, herein the time required by the electric scooter is a sum of the following time: the time required by the electric scooter to drive to the target charging device, the time required by the electric scooter for charging, and the time required by the electric scooter to return from the target charging device to the first current geographical position.

In this embodiment of the present disclosure, under the condition in which the electric scooter is reserved by the target account number and the electric quantity of the electric scooter is lower than the electric quantity required by the electric scooter to drive to the target position reserved by the target account number, the method further includes the following steps: first prompt information is sent to the target account number, herein the first prompt information is used for indicating that the electric quantity of the electric scooter is insufficient, and replacing the electric scooter reserved by the target account number as a second electric scooter, and the electric quantity of the second target electric scooter is greater than the electric quantity required by the electric scooter to drive to the target position reserved by the target account number.

In this embodiment of the present disclosure, under the condition in which the electric scooter is reserved by the target account number, the electric quantity of the electric scooter is greater than the electric quantity required by the electric scooter to drive to the target position reserved by the target account number, and after the electric scooter drives to the target position reserved by the target account number, the remaining electric quantity is anticipated to be lower than the electric quantity required by the electric scooter to drive from the target position to the target charging device nearest to the target position, the method further includes the following step.

Second prompt information is sent to the target account number, herein the second prompt information is used for indicating that the electric quantity of the electric scooter is insufficient, and replacing the electric scooter reserved by the target account number as a third electric scooter, the electric quantity of the third target electric scooter is greater than the electric quantity required by the electric scooter to drive to the target position reserved by the target account number, and after the third electric scooter drives to the target position reserved by the target account number, the remaining electric quantity is anticipated to be greater than the electric quantity required by the third electric scooter to drive from the target position to the target charging device nearest to the target position.

In this embodiment of the present disclosure, under the condition in which the electric scooter is reserved by the target account number and the electric quantity of the electric scooter is lower than the electric quantity required by the electric scooter to drive to the target position reserved by the target account number, or, under the condition in which the electric scooter is reserved by the target account number, the electric quantity of the electric scooter is greater than the electric quantity required by the electric scooter to drive to the target position reserved by the target account number, and after the electric scooter drives to the target position reserved by the target account number, the remaining electric quantity is anticipated to be lower than the electric quantity required by the electric scooter to drive from the target position to the target charging device nearest to the target position, after the step that the electric scooter is piloted to the target charging device according to the first navigation path for charging, the method further includes the following step: the electric scooter is controlled to automatically return to the first current geographical position.

In combination with an example, the description will be made for what conditions may be defined as the conditions needing to be charged but is not intended to limit the technical solutions in the embodiments of the present disclosure.

When a user rides, it is detected by an electric scooter that the current electric quantity has already reached to a charging threshold and an available target charging device is present within an endurance range. In such a situation, the user may be reminded of going to charge, and in the charging process, another scooter with full electric quantity is replaced for the user to use continuously.

When the user makes a reservation for use via an APP of a mobile phone, the electric scooter automatically calculates whether the current electric quantity supports to reach the destination or not as well as the remaining electric quantity after the user reaches the destination and a distance of an available charging station (equivalent to the target charging device in the foregoing embodiment), if any one of conditions is not met, the vehicle automatically drives to a current available charging station to supplement a part of electric quantity, and returns to a current position for waiting upon completion; or the current electric scooter sends a request to a background to express that the endurance cannot support to reach the destination, and a background server finds a scooter meeting the endurance requirement from a nearby place to drive to the current position as a replacement.

When no available charging station is present within a vehicle endurance reachable area, a worker is prompted for rescue; and the worker carries the scooter with the low electric quantity on the road by using a charging van, charges the scooter with a vehicle-mounted power supply and places it on a placement point on the road upon the completion of charging.

The electric scooter has a mutual charging function. If the electric quantity of the current scooter is low and the charging station is not within a reachable range, rescue information is sent, the background server notifies the scooter of other scooters with sufficient electric quantity nearby and sends the position information of them, and the current scooter judges whether the other scooters are within the reachable range or not by planning a navigation path, and drives, if the other scooters are reachable, to charge mutually.

It is to be noted that the electric scooter in this embodiment of the present disclosure needs to have an piloting ability, and the charging manner of the electric scooter without the piloting ability is the same as the conventional art and the electric scooter needs to be manually transported to a position herein a charging device is located for charging.

In other words, in the technical solutions provided by this embodiment of the present disclosure, when the electric scooter with the piloting function has the low electric quantity (i.e., the electric scooter needs to be charged), the electric scooter finds an available charging device to which the endurance may reach nearby via a positioning function, acquires a navigation path via an internal map or from a server side, and enters an piloting mode; meanwhile, training wheels may be selected to prevent the turnover of the scooter in movement; and during the piloting process, the scooter detects a surrounding environment, road and obstacle via a camera or radar component according to the navigation path, and actively avoids the obstacle and waits for a predetermined period of time; and the scooter automatically moves to the position of the charging device by using the piloting function for charging.

Embodiment 3

Figure 3:
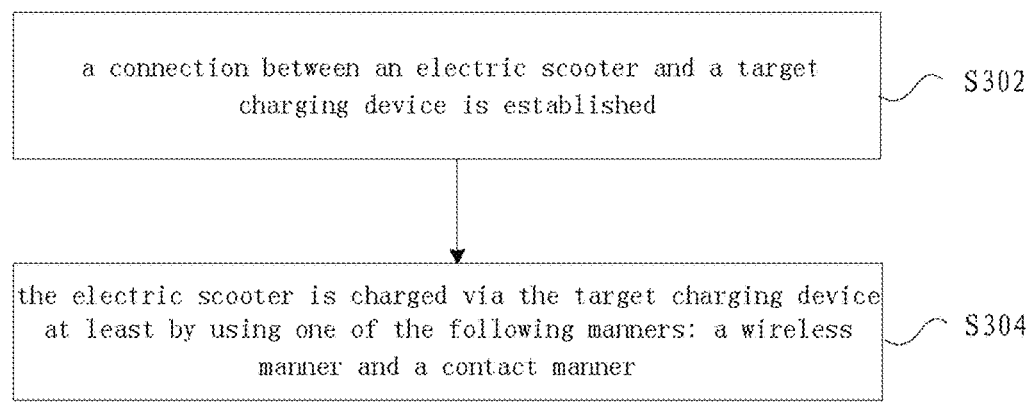
FIG. 3 illustrates another flowchart of an electric scooter charging method according to an embodiment of the present disclosure.

This embodiment of the present disclosure provides a method for charging an electric scooter. FIG. 3 illustrates a flowchart of another method for charging an electric scooter according to an embodiment of the present disclosure. As illustrated in FIG. 3, the method includes the following steps.

At Step S302, a connection between an electric scooter and a target charging device is established.

At Step S304, the electric scooter is charged via the target charging device at least by using one of the following manners: a wireless manner and a contact manner.

With the above steps, after the electric scooter establishes the connection with the target charging device, the target charging device can charge the electric scooter via the wireless manner or contact manner. By adopting the above technical solutions, the problem of single charging manner of the target charging device to the electric scooter in the related art is solved; and the electric scooter may be charged by adopting the wireless manner or contact manner, so that the charging process of the electric scooter is simplified.

In the process when the target charging device charges the electric scooter by adopting the wireless manner, the method further includes at least one of the followings.

Under a condition in which it is detected by an image identification component (it may be a camera) that an object whose type is not the electric scooter is present in a wireless charging area, the electric scooter is stopped to be charged.

Under the condition in which it is detected by the image identification component that the object whose type is not the electric scooter is present in the wireless charging area, the image identification component sends alarm information to a server, wherein the alarm information is used for indicating that the object whose type is not the electric scooter is present in the wireless charging area.

Charging in the Contact Manner

Figure 4:
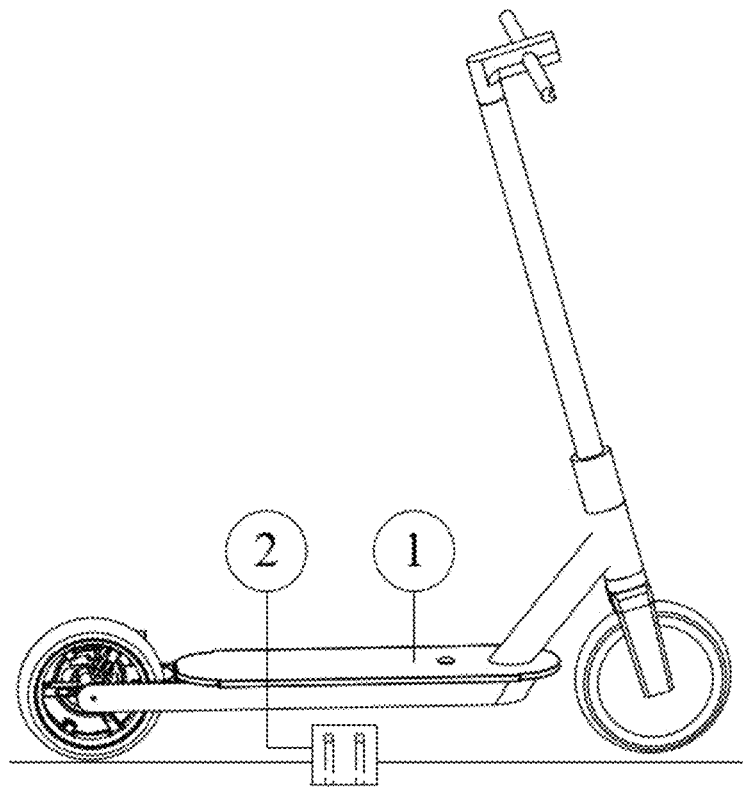
FIG. 4 illustrates a schematic diagram for charging in a contact manner according to an embodiment of the present disclosure.

As illustrated in FIG. 4 (1 indicates the electric scooter and 2 indicates the contact), a contact covering on the electric scooter is moved by a movement part of the target charging device, so that a charging contact on the electric scooter is exposed out, wherein the contact covering is configured to at least perform waterproof protection on the charging contact; the target charging device contacts the charging contact to charge the electric scooter, further, after the electric scooter is charged completely, the contact covering is automatically moved to an initial position to at least perform the waterproof protection on the charging contact; or after the electric scooter is charged completely, the contact covering is moved by the movement part to the initial position to at least perform the waterproof protection on the charging contact.

Charging in the Wireless Manner

A plurality of electric scooters are charged via one wireless charging module of the target charging device.

Figure 5:
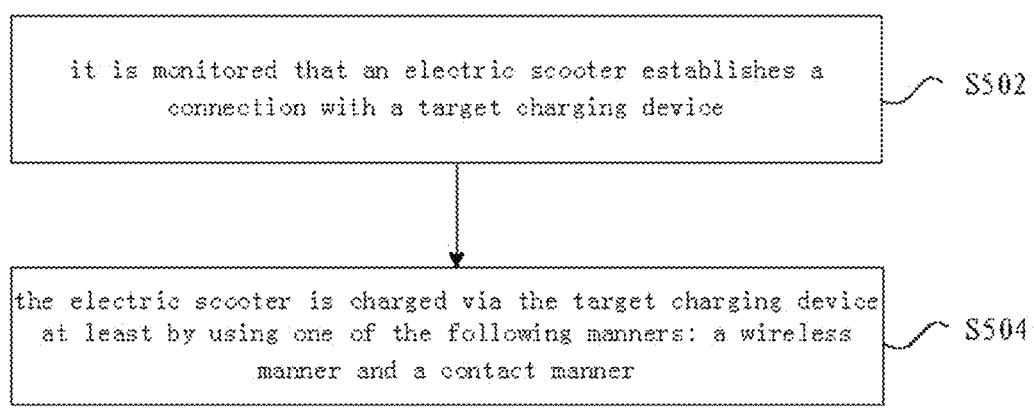
FIG. 5 illustrates a still another flowchart of a method for charging an electric scooter according to an embodiment of the present disclosure.

An embodiment of the present disclosure provides a method for charging an electric scooter. FIG. 5 illustrates a flowchart of another method for charging an electric scooter according to an embodiment of the present disclosure. As illustrated in FIG. 5, the method includes the following steps.

At Step S502, it is monitored that an electric scooter establishes a connection with a target charging device.

At Step S504, the electric scooter is charged via the target charging device at least by using one of the following manners: a wireless manner and a contact manner.

With the above steps, after the electric scooter establishes the connection with the target charging device, the target charging device can charge the electric scooter via the wireless manner or contact manner. By adopting the above technical solutions, the problem of single charging manner of the target charging device to the electric scooter in the related art is solved, and the electric scooter may be charged by adopting the wireless manner or contact manner, so that the charging process of the electric scooter is simplified.

Before the step S502 is executed, the method further includes the following step: the electric scooter is piloted to the target charging device according to a navigation path, wherein the navigation path is used for indicating a path of the electric scooter from a current geographical position to a target geographical position of the target charging device, and the current geographical position is obtained by a GPS module on the electric scooter.

For the above charging manner, regardless of the contact charging manner or the wireless charging manner, the following embodiment of the present disclosure further provides an example for understanding and description.

When an electric scooter pilots to an entrance of a charging area, the scooter is guided to a charging position via any manner of enabling a traction device in the charging area to hook a handle, clamp a scooter body or arrange a conveyor belt and the like, so that positions of a charging interface and the electric scooter are completely corresponding.

Figure 6:
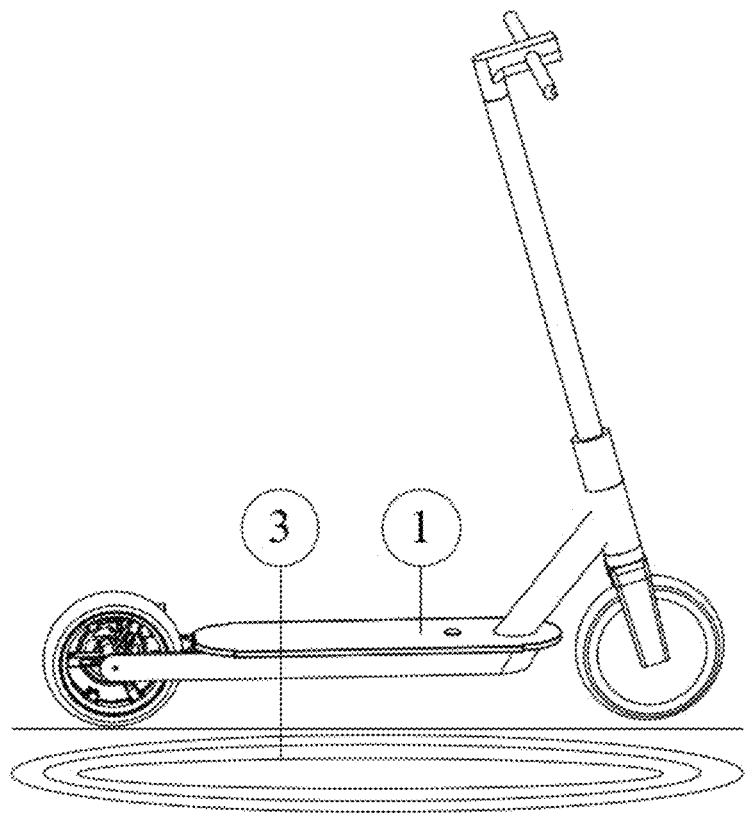
FIG. 6 illustrates a schematic diagram for charging in a wireless manner according to an embodiment of the present disclosure.

As illustrated in FIG. 6 (1 indicates the electric scooter and 3 indicates the wireless charging module), the wireless charging manner is to bury the wireless charging module under the ground or directly place the wireless charging module on the ground for planar distribution. The to-be-charged device may be charged as long as it is placed into the charging area, i.e., the wireless charging module may simultaneously correspond to a plurality of to-be-charged devices (electric scooters) and a power supply is connected to taken as a launcher in wireless charging. When the scooter is operated to be above the charging device (piloting or manual placement), a wireless charging receiver built in a battery of the scooter is cooperated with the launcher to implement automatic wireless charging of the scooter.

The judgment of a vehicle state is added in the wireless charging operation. One-to-many charging is provided at present. If the scooter and a metal object except the scooter are simultaneously located in the charging area, since the scooter meets the charging requirement and the wireless charging starts to work, the metal object except the scooter will cause a damage to the wireless charging device in such a situation. A camera is provided above the wireless charging area, so whether a metal object except the scooter is placed in the charging area or not is detected via image identification; and in a case where the metal object except the scooter is detected, the charging process is interrupted and an alarm is sent to prompt the worker.

For a wired charging device (i.e., charging in the contact manner), when the electric scooter is arranged orderly via a conveyor belt or other transportation device and is conveyed to the charging position, a charging contact covering (it may be a cabin door, a sliding cover, a rubber plug and other waterproof and dustproof manner) of the scooter is opened via an own or charging device assorted tool of the scooter, and the target charging device charges the metal contact on the scooter. Upon the completion of the charging, the charging device is separated automatically and the charging contact covering is reset.

After the charging process is completed, the vehicle notifies a background server, the server directs the vehicle to drive a placement position with few vehicles and the vehicle drives to the placement position automatically.

Through the above description of the embodiment, those skilled in the art may clearly understand that the method according to the above embodiment may be implemented through software in connection with a necessary general hardware platform, or may be implemented by hardware. However, in many cases, the former is a better implementation. Based on this understanding, the technical solution of the embodiment of the present disclosure in essence or the part contributing to the prior art may be embodied in the form of a software product. The computer software product is stored in a storage medium (such as a ROM/RAM, a magnetic disc, an optical disc), including several instructions which may cause a terminal device (such as a mobile phone, a computer, a server, or a network device and the like) to execute the method according to the embodiments of the present disclosure.

Embodiment 4

Figure 7:
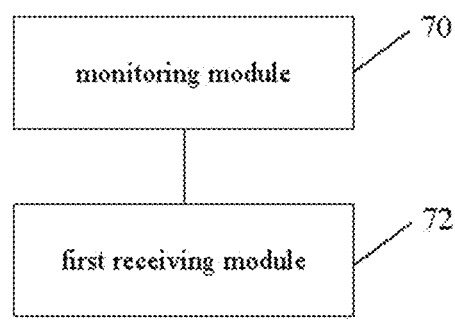
FIG. 7 illustrates a second structural block diagram of an electric scooter according to an embodiment of the present disclosure.

This embodiment of the present disclosure provides an electric scooter. FIG. 7 illustrates a second structural block diagram of an electric scooter according to an embodiment of the present disclosure. As illustrated in FIG. 7, the electric scooter may include a monitoring module 70 and a first receiving module 72.

The monitoring module 70 is configured to monitor that an electric scooter have established a connection with a target charging device.

The first receiving module 72 is configured to charge the electric scooter via the target charging device at least by using one of the following manners: a wireless manner and a contact manner.

With the present disclosure, after the electric scooter establishes the connection with the target charging device, the target charging device can charge the electric scooter via the wireless manner or contact manner. By adopting the above technical solutions, the problem of single charging manner of the target charging device to the electric scooter in the related art is solved, and the electric scooter may be charged by adopting the wireless manner or contact manner, so that the charging process of the electric scooter is simplified.

Figure 8:
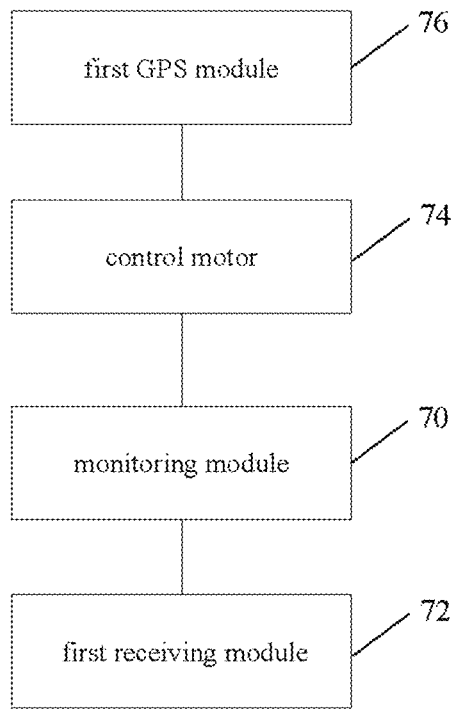
FIG. 8 illustrates a third structural block diagram of an electric scooter according to an embodiment of the present disclosure.

In this embodiment of the present disclosure, as illustrated in FIG. 8, the electric scooter further includes a control motor 74.

The control motor 74 is configured to pilot the electric scooter to the target charging device according to a navigation path, wherein the navigation path is used for indicating a path of the electric scooter from a current geographical position to a target geographical position of the target charging device.

In this embodiment of the present disclosure, as illustrated in FIG. 8, the electric scooter further includes a first GPS module 76, configured to acquire the current geographical position.

In this embodiment of the present disclosure, there is further provided a charging device, configured to execute the method for charging the electric scooter in any item of the third embodiment.

Embodiment 5

Figure 9:
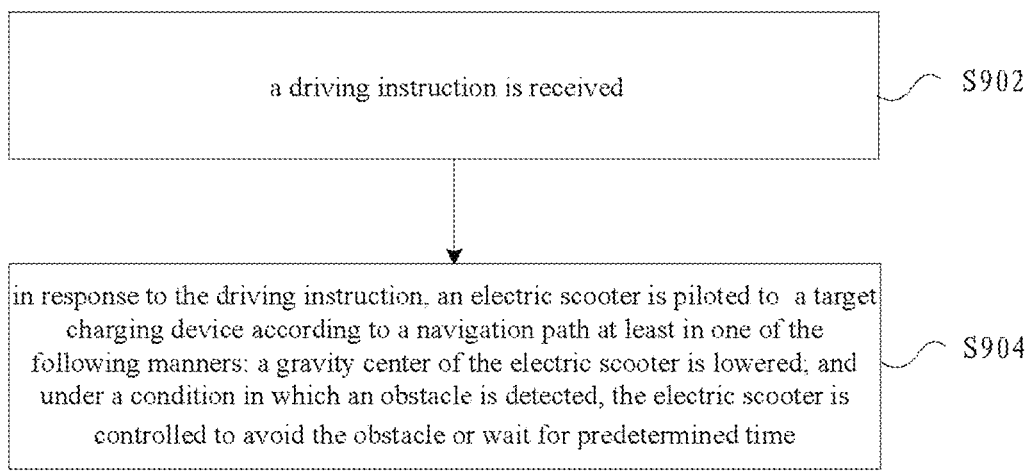
FIG. 9 illustrates a flowchart of an electric scooter piloting method according to an embodiment of the present disclosure.

This embodiment of the present disclosure provides an electric scooter piloting method. FIG. 9 illustrates a flowchart of an electric scooter piloting method according to an embodiment of the present disclosure. As illustrated in FIG. 9, the method includes the following steps.

At Step S902, a driving instruction is received.

At Step S904, in response to the driving instruction, an electric scooter is piloted to a target charging device according to a navigation path at least in one of the following manners: a gravity center of the electric scooter is lowered; and under a condition in which an obstacle is detected, the electric scooter is controlled to avoid the obstacle or wait for a predetermined period of time.

With the above steps, in the piloting process of the electric scooter, the gravity center of the electric scooter is lowered; and/or under the condition in which the obstacle is detected, the electric scooter is controlled to avoid the obstacle or wait for the predetermined time, so the technical problems of unsafety and easy turnover in the piloting process of the electric scooter are solved, and thus the safety of the electric scooter in piloting is improved.

Before the step S904, whether the obstacle is present or not within a predetermined range from the electric scooter is detected via a detection component on the electric scooter, herein the detection component at least includes one of the followings: a camera, a radar assembly and a sensor.

Figure 10:
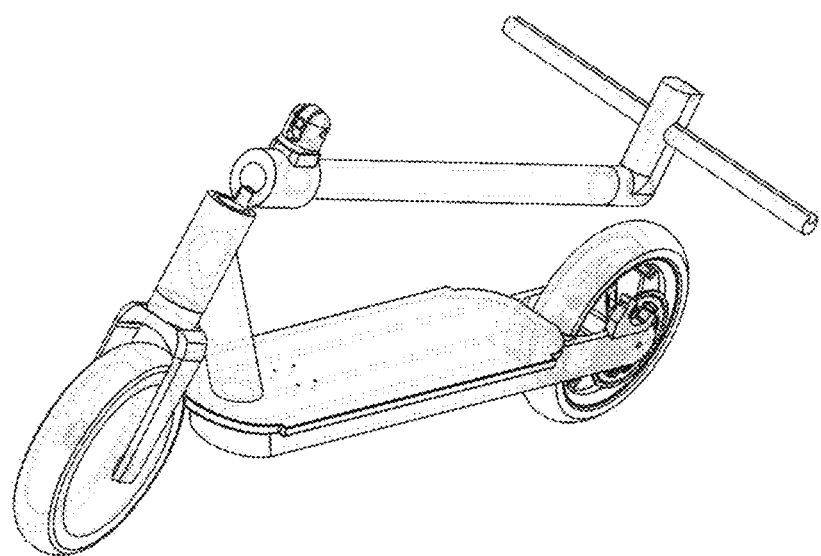
FIG. 10 illustrates a first schematic diagram showing that a gravity center of an electric scooter is lowered according to an embodiment of the present disclosure.
Figure 11:
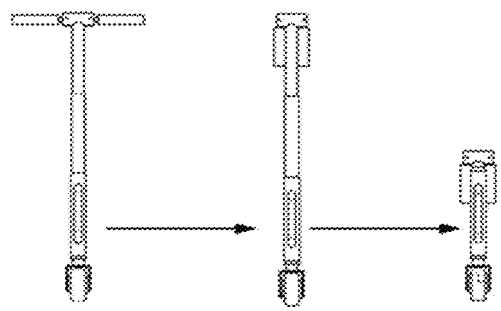
FIG. 11 illustrates a second schematic diagram showing that a gravity center of an electric scooter is lowered according to an embodiment of the present disclosure.

Optionally, the step that a gravity center of the electric scooter is lowered includes at least one of the followings: a support rod of the electric scooter is controlled to automatically fold to lower the gravity center of the electric scooter. As illustrated in FIG. 10, the support rod of the electric scooter is folded downward so that a handle is opposite to a rear wheel and thus the gravity center of the electric scooter is lowered. The support rod of the electric scooter is controlled to automatic reduce a height of the support rod to lower the gravity center of the electric scooter. As illustrated in FIG. 11, the handle of the electric scooter is folded downward first and then the support rod is drawn back into a portion at the rightmost side in FIG. 11. It is to be noted that, in this embodiment of the present disclosure, the support rod may be drawn back first and then the handle is folded, which is not defined by this embodiment of the present disclosure thereto.

In order to prevent the turnover of the electric scooter, this embodiment of the present disclosure further provides the following technical solution: training wheels provided on the electric scooter are used to prevent the turnover of the electric scooter.

In this embodiment of the present disclosure, the navigation path includes: a path from a current geographical position of the electric scooter to a target geographical position of the target charging device, wherein the current geographical position is acquired by a Global Position System (GPS) module of the electric scooter.

Through the above description of the embodiment, those skilled in the art may clearly understand that the method according to the above embodiment may be implemented through software in connection with a necessary general hardware platform, or may be implemented by hardware. However, in many cases, the former is a better implementation. Based on this understanding, the technical solution of the embodiment of the present disclosure in essence or the part contributing to the prior art may be embodied in the form of a software product. The computer software product is stored in a storage medium (such as a ROM/RAM, a magnetic disc, an optical disc), including several instructions which may cause a terminal device (such as a mobile phone, a computer, a server, or a network device and the like) to execute the method according to the embodiments of the present disclosure.

Embodiment 6

Figure 12:
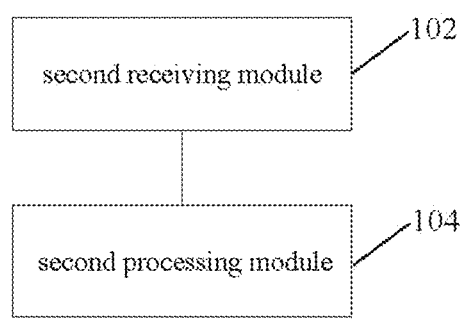
FIG. 12 illustrates a fourth structural block diagram of an electric scooter according to an embodiment of the present disclosure.
Figure 13:
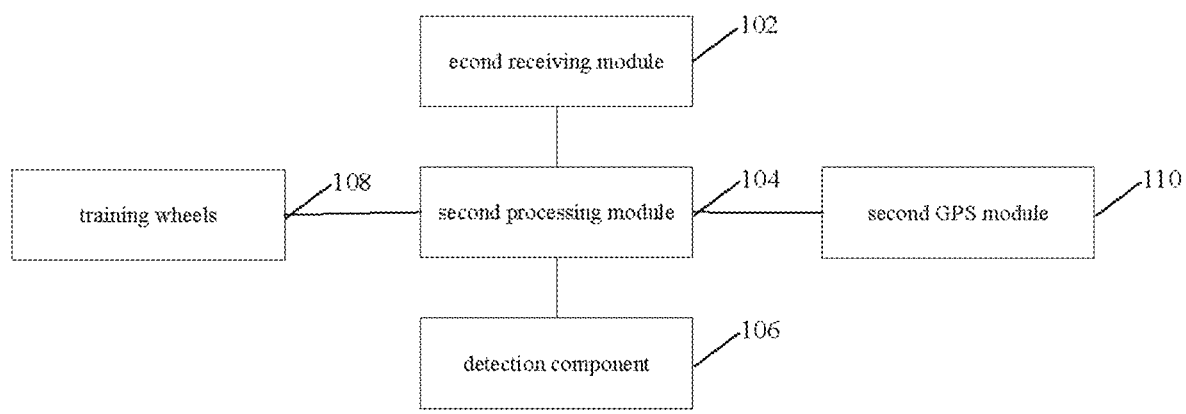
FIG. 13 illustrates a fifth structural block diagram of an electric scooter according to an embodiment of the present disclosure.

This embodiment of the present disclosure provides an electric scooter. FIG. 12 illustrates a fourth structural block diagram of an electric scooter according to an embodiment of the present disclosure. As illustrated in FIG. 12, the electric scooter may include a second receiving module 102 and a second processing module 104.

The second receiving module 102 is configured to receive a driving instruction.

The second processing module 104 is configured to pilot, in response to the driving instruction, an electric scooter to a target charging device according to a navigation path at least in one of the following manners: a gravity center of the electric scooter is lowered; and under a condition in which an obstacle is detected, the electric scooter is controlled to avoid the obstacle or wait for a predetermined period of time.

With the present disclosure, in the piloting process of the electric scooter, the gravity center of the electric scooter is lowered; and/or under the condition in which the obstacle is detected, the electric scooter is controlled to avoid the obstacle or wait for the predetermined time, so the technical problems of unsafety and easy turnover in the piloting process of the electric scooter are solved, and thus the safety of the electric scooter in piloting is improved.

As illustrated in FIG. 11, the electric scooter further includes: a detection component 106, and the detection component 106 is configured to detect whether the obstacle is present or not within a predetermined range from the electric scooter.

As illustrated in FIG. 11, the electric scooter further includes: training wheels 108 and a GPS module 110, herein the training wheels 108 are provided on the electric scooter; and the second GPS module 110 is configured to acquire a current geographical position of the electric scooter.

Through the above description of the embodiment, those skilled in the art may clearly understand that the method according to the above embodiment may be implemented through software in connection with a necessary general hardware platform, or may be implemented by hardware. However, in many cases, the former is a better implementation. Based on this understanding, the technical solution of the embodiment of the present disclosure in essence or the part contributing to the prior art may be embodied in the form of a software product. The computer software product is stored in a storage medium (such as a ROM/RAM, a magnetic disc, an optical disc), including several instructions which may cause a terminal device (such as a mobile phone, a computer, a server, or a network device and the like) to execute the method according to the embodiments of the present disclosure.

It is to be noted that the technical solutions in the first embodiment to the sixth embodiment may be combined to use, and may also be used individually, which is not defined by this embodiment of the present disclosure thereto.

Embodiment 7

This embodiment of the present disclosure further provides a storage medium; the storage medium includes a storage program, and the program executes the above any method in running.

Optionally, in this embodiment, the above storage medium may be configured to store a program code for executing the following steps.

At S1, whether an electric scooter needs to be charged or not is detected.

At S2, under a condition in which the electric scooter needs to be charged, a first navigation path from a first current geographical position of the electric scooter to a target geographical position of a target charging device is acquired.

At S3, the electric scooter is controlled to automatically drive to the target charging device according to the first navigation path for charging.

Embodiment 8

This embodiment of the present disclosure further provides a storage medium; the storage medium includes a storage program, and the program executes the above any method in running.

Optionally, in this embodiment, the above storage medium may be configured to store a program code for executing the following steps.

At S4, a connection between an electric scooter and a target charging device is established.

At S5, the electric scooter is charged via the target charging device at least by using one of the following manners: a wireless manner and a contact manner.

Embodiment 9

This embodiment of the present disclosure further provides a storage medium; the storage medium includes a storage program, and the program executes the above any method in running.

Optionally, in this embodiment, the above storage medium may be configured to store a program code for executing the following steps.

At S6, it is monitored that an electric scooter establishes a connection with a target charging device.

At S7, the electric scooter is charged via the target charging device at least by using one of the following manners: a wireless manner and a contact manner.

Embodiment 10

This embodiment of the present disclosure further provides a storage medium; the storage medium includes a storage program, and the program executes the above any method in running.

Optionally, in this embodiment, the above storage medium may be configured to store a program code for executing the following steps.

At S8, a driving instruction is received.

At S9, in response to the driving instruction, an electric scooter is piloted to a target charging device according to a navigation path at least in one of the following manners: a gravity center of the electric scooter is lowered; and under a condition in which an obstacle is detected, the electric scooter is controlled to avoid the obstacle or wait for a predetermined period of time.

Optionally, in this embodiment, the above storage medium may include but not limited to: various media capable of storing the computer program such as a U disk, a Read-Only Memory (abbreviated as ROM), a Random Access Memory (abbreviated as RAM), a mobile hard disk, a magnetic disk or an optical disc.

Optionally, the specific examples in this embodiment may be referred to the examples described in the above embodiments and optional implementation manners, and will not be repeated here in this embodiment.

Obviously, those skilled in the art should know that each module or each step of the present disclosure may be implemented by a universal computing device, and the modules or steps may be concentrated on a single computing device or distributed on a network formed by a plurality of computing devices, and may optionally be implemented by program codes executable for the computing devices, so that the modules or steps may be stored in a storage device for execution with the computing devices, the shown or described steps may be executed in sequences different from those described here in some circumstances, or may form each integrated circuit module respectively, or multiple modules or steps therein may form a single integrated circuit module for implementation. Therefore, the present disclosure is not limited to any specific hardware and software combination.

The above is only the optional embodiment of the present disclosure and not intended to limit the scope of protection of the present disclosure. For those skilled in the art, the present disclosure may have various modifications and variations. Any modifications, equivalent replacements, improvements and the like made within the spirit and principle of the present disclosure shall fall within the scope of protection of the present disclosure.

What is claimed is:

1. An electric scooter piloting method, comprising:
receiving a driving instruction; and
in response to the driving instruction, piloting the electric scooter to a target charging device according to a navigation path at least in the following manner: lowering a gravity center of the electric scooter, wherein lowering the gravity center of the electric scooter comprises at least one of the followings:
controlling a support rod of the electric scooter to automatically fold to lower the gravity center of the electric scooter; and
controlling the support rod of the electric scooter to automatically reduce a height of the support rod to lower the gravity center of the electric scooter, wherein under the condition in which the electric scooter is reserved by a target account number and an electric quantity of the electric scooter is lower than the electric quantity required by the electric scooter to drive to a target position reserved by the target account number, or, under the condition in which the electric scooter is reserved by the target account number, the electric quantity of the electric scooter is greater than the electric quantity required by the electric scooter to drive to the target position reserved by the target account number, and after the electric scooter drives to the target position reserved by the target account number, a remaining electric quantity is anticipated to be lower than the electric quantity required by the electric scooter to drive from the target position to the target charging device nearest to the target position,
piloting the electric scooter to a target charging device according to a navigation path further comprises: under a condition in which a time required by the electric scooter is earlier than a use time reserved by the target account number, the electric scooter is piloted to the target charging device according to a first navigation path for charging, wherein the time required by the electric scooter is a sum of the following time: a time required by the electric scooter to drive to the target charging device, a time required by the electric scooter for charging, and a time required by the electric scooter to return from the target charging device to the first current geographical position.

2. The method as claimed in claim 1, wherein before piloting the electric scooter to the target charging device according to the navigation path at least in one of the following manners: lowering a gravity center of the electric scooter; and under a condition in which an obstacle is detected, controlling the electric scooter to avoid the obstacle or wait for predetermined time, the method further comprises:
detecting, via a detection component on the electric scooter, whether the obstacle is present or not within a predetermined range from the electric scooter.

3. The method as claimed in claim 2, wherein the detection component at least comprises one of the followings: a camera, a radar assembly and a sensor.

4. The method as claimed in claim 1, wherein before piloting the electric scooter to the target charging device according to the navigation path at least in one of the following manners: lowering a gravity center of the electric scooter; and under a condition in which an obstacle is detected, controlling the electric scooter to avoid the obstacle or wait for predetermined time, the method further comprises:
use training wheels provided on the electric scooter to prevent the electric scooter from turning over.

5. The method as claimed in claim 1, wherein the navigation path comprises: a path from a current geographical position of the electric scooter to a target geographical position of the target charging device, wherein the current geographical position is acquired by a Global Position System (GPS) module of the electric scooter.

6. The method as claimed in claim 2, wherein before piloting the electric scooter to the target charging device according to the navigation path at least in one of the following manners: lowering a gravity center of the electric scooter; and under a condition in which an obstacle is detected, controlling the electric scooter to avoid the obstacle or wait for predetermined time, the method further comprises:
use training wheels provided on the electric scooter to prevent the electric scooter from turning over.

7. The method as claimed in claim 1, wherein before piloting the electric scooter to the target charging device according to the navigation path at least in one of the following manners: lowering a gravity center of the electric scooter; and under a condition in which an obstacle is detected, controlling the electric scooter to avoid the obstacle or wait for predetermined time, the method further comprises:
use training wheels provided on the electric scooter to prevent the electric scooter from turning over.

8. The method as claimed in claim 3, wherein before piloting the electric scooter to the target charging device according to the navigation path at least in one of the following manners: lowering a gravity center of the electric scooter; and under a condition in which an obstacle is detected, controlling the electric scooter to avoid the obstacle or wait for predetermined time, the method further comprises:
use training wheels provided on the electric scooter to prevent the electric scooter from turning over.

9. The method as claimed in claim 2, wherein the navigation path comprises: a path from a current geographical position of the electric scooter to a target geographical position of the target charging device, wherein the current geographical position is acquired by a GPS module of the electric scooter.

10. The method as claimed in claim 1, wherein the navigation path comprises: a path from a current geographical position of the electric scooter to a target geographical position of the target charging device, wherein the current geographical position is acquired by a GPS module of the electric scooter.

11. The method as claimed in claim 3, wherein the navigation path comprises: a path from a current geographical position of the electric scooter to a target geographical position of the target charging device, wherein the current geographical position is acquired by a GPS module of the electric scooter.

12. An non-transitory storage medium, wherein the storage medium stores a computer program, and the computer program is configured to execute the method as claimed in claim 1 in running.

13. An electric scooter, comprising a memory and a processor, wherein the memory stores a computer program; and the computer program is configured to implement the following program modules when being executed by the processor:
a receiving module, configured to receive a driving instruction; and
a processing module, configured to pilot, in response to the driving instruction, the electric scooter to a target charging device according to a navigation path at least in the following manner: lowering a gravity center of the electric scooter, wherein the electric scooter further comprises:
a lowering module, configured to control a support rod of the electric scooter to automatically fold to lower the gravity center of the electric scooter; or control the support rod of the electric scooter to automatically reduce a height of the support rod to lower the gravity center of the electric scooter, wherein under the condition in which the electric scooter is reserved by a target account number and an electric quantity of the electric scooter is lower than the electric quantity required by the electric scooter to drive to a target position reserved by the target account number, or, under the condition in which the electric scooter is reserved by the target account number, the electric quantity of the electric scooter is greater than the electric quantity required by the electric scooter to drive to the target position reserved by the target account number, and after the electric scooter drives to the target position reserved by the target account number, a remaining electric quantity is anticipated to be lower than the electric quantity required by the electric scooter to drive from the target position to the target charging device nearest to the target position,
piloting the electric scooter to a target charging device according to a navigation path further comprises: under a condition in which a time required by the electric scooter is earlier than a use time reserved by the target account number, the electric scooter is piloted to the target charging device according to a first navigation path for charging, wherein the time required by the electric scooter is a sum of the following time: a time required by the electric scooter to drive to the target charging device, a time required by the electric scooter for charging, and a time required by the electric scooter to return from the target charging device to the first current geographical position.

14. The electric scooter as claimed in claim 13, wherein the electric scooter further comprises: a detection component; and the detection component is configured to detect whether the obstacle is present or not within a predetermined range from the electric scooter.

15. The electric scooter as claimed in claim 13, wherein the electric scooter further comprises: training wheels, provided on the electric scooter.

16. The electric scooter as claimed in claim 13, wherein the electric scooter further comprises: a Global Position System (GPS) module, configured to acquire a current geographical position of the electric scooter.

17. The electric scooter as claimed in claim 14, wherein the detection component at least comprises one of the followings: a camera, a radar assembly and a sensor.

\* \* \* \* \*